(12) United States Patent
Susnjara et al.

(10) Patent No.: US 10,071,525 B2
(45) Date of Patent: *Sep. 11, 2018

(54) APPARATUS AND METHOD FOR PRINTING LONG COMPOSITE THERMOPLASTIC PARTS ON A DUAL GANTRY MACHINE DURING ADDITIVE MANUFACTURING

(71) Applicant: Thermwood Corporation, Dale, IN (US)

(72) Inventors: Kenneth J. Susnjara, Birdseye, IN (US); Brian S. Smiddy, Newburgh, IN (US); Jonathan I. Fuquay, Boonville, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,469

(22) Filed: Jun. 13, 2017

(65) Prior Publication Data

US 2018/0222124 A1 Aug. 9, 2018

Related U.S. Application Data

(60) Provisional application No. 62/456,070, filed on Feb. 7, 2017.

(51) Int. Cl.
    *B29C 67/00* (2017.01)
    *B29C 70/16* (2006.01)
    (Continued)

(52) U.S. Cl.
    CPC ...... *B29C 67/0055* (2013.01); *B29C 67/0088* (2013.01); *B29C 67/0092* (2013.01);
    (Continued)

(58) Field of Classification Search
    CPC ..... B29C 64/386; B29C 64/20; B29C 70/384; B29C 70/16; B29C 70/546; B33Y 10/00; B33Y 50/02; B33Y 30/00; B29K 2105/08
    See application file for complete search history.

(56) References Cited

U.S. PATENT DOCUMENTS 5,172,326 A * 12/1992 Campbell, Jr. ...... B23K 26/032
    700/134
9,114,453 B2 * 8/2015 Shan ....................... B22C 23/00
(Continued)

FOREIGN PATENT DOCUMENTS

WO    WO 2009/012317 A2    1/2009

OTHER PUBLICATIONS

International Search Report and Written Opinion for International Patent Application No. PCT/US2018/012979, dated May 17, 2018, (15 pages).

*Primary Examiner* — Nahida Sultana
(74) *Attorney, Agent, or Firm* — Bookoff McAndrews, PLLC

(57) ABSTRACT

Embodiments of the present disclosure are drawn to additive manufacturing apparatus and methods. An exemplary apparatus for fabricating components via additive manufacturing may include a programmable CNC machine. The CNC machine may comprise a first worktable extending in a first plane and a second worktable extending in a second plane, wherein the second plane is oriented at an angle relative to the first plane. At least one conveyor belt may be operably coupled to the first worktable. A printing gantry may be displaceable along a first axis of the CNC machine. The CNC machine may also comprise an applicator having a nozzle configured to deposit material on the second worktable.

20 Claims, 5 Drawing Sheets

(51) Int. Cl.

| | |
|---|---|
| *B29C 70/38* | (2006.01) |
| *B29C 70/54* | (2006.01) |
| *B33Y 10/00* | (2015.01) |
| *B33Y 30/00* | (2015.01) |
| *B33Y 50/02* | (2015.01) |
| B29K 105/08 | (2006.01) |

(52) U.S. Cl.
CPC ............ *B29C 70/16* (2013.01); *B29C 70/384* (2013.01); *B29C 70/546* (2013.01); *B33Y 10/00* (2014.12); *B33Y 30/00* (2014.12); *B33Y 50/02* (2014.12); *B29K 2105/08* (2013.01)

(56) References Cited

U.S. PATENT DOCUMENTS

| | | | |
|---|---|---|---|
| 2010/0194013 A1* | 8/2010 | Hall | C02F 1/006 |
| | | | 269/56 |
| 2011/0011222 A1* | 1/2011 | Bales | B23K 31/02 |
| | | | 83/13 |
| 2016/0236421 A1 | 8/2016 | Mannella et al. | |
| 2016/0274565 A1* | 9/2016 | Vesco | G01C 5/04 |
| 2016/0288424 A1* | 10/2016 | Susnjara | B29C 67/0088 |
| 2016/0318248 A1* | 11/2016 | Susnjara | B29C 64/106 |
| 2017/0095879 A1* | 4/2017 | Mitra | B23K 10/006 |
| 2017/0120522 A1 | 5/2017 | Skubic et al. | |
| 2017/0182698 A1* | 6/2017 | Susnjara | B29C 47/06 |
| 2017/0246703 A1* | 8/2017 | Fagan | B23K 10/006 |
| 2017/0255184 A1* | 9/2017 | Henning | G05B 19/4097 |
| 2017/0361525 A1* | 12/2017 | Warner | B33Y 10/00 |
| 2018/0029171 A1* | 2/2018 | Jackson | B23K 37/0235 |
| 2018/0107193 A1* | 4/2018 | Henning | G05B 19/4145 |
| 2018/0117898 A1* | 5/2018 | Skogsrud | B33Y 50/02 |
| 2018/0154475 A1* | 6/2018 | Fagan | B23K 10/006 |

\* cited by examiner

APPARATUS AND METHOD FOR PRINTING LONG COMPOSITE THERMOPLASTIC PARTS ON A DUAL GANTRY MACHINE DURING ADDITIVE MANUFACTURING

CROSS-REFERENCE TO RELATED APPLICATION

This application claims the benefit under 35 U.S.C. § 119 to U.S. Provisional Patent Application No. 62/456,070, filed Feb. 7, 2017, the entirety of which is herein incorporated by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing manufacturing techniques or processes.

BACKGROUND

Additive manufacturing techniques and processes generally involve the buildup of one or more materials, e.g., layering, to make a net or near net shape (NNS) object, in contrast to subtractive manufacturing methods, in which material is removed. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material, and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material is applied to the existing structure in layers, melting and fusing with the existing material to produce a solid finished part.

There are two different approaches commonly used to produce large parts during additive manufacturing. In the first approach, material is deposited through a nozzle vertically downward onto a worktable to print the first layer. Subsequent layers are deposited over a contour of the first layer to produce a final, solid finished part. In this first approach, the nozzle is moved along a horizontal plane to trace the geometry of each layer. The worktable may move downward away from the nozzle after each layer is completed to provide clearance for the next layer. In some aspects, the nozzle may be able to move vertically upward away from the worktable in addition to having a moveable worktable. If the nozzle is vertically displaceable, the worktable may not need to move each time a layer is completed, or may need to move less.

The second approach to producing large parts during additive manufacturing is to utilize a nozzle that moves in a horizontal plane as well as in a vertical plane. In this arrangement, the nozzle may move downward towards a fixed worktable, may move around the worktable to trace the geometry of the printed layer, and may then move upward away from the worktable to provide clearance for the next layer.

Both of these approaches generally use a method that is different than traditional net shape 3D printing. In net shape 3D printing, flowable, thermoplastic material is added in thin horizontal layers, with each new layer being fused to the material already deposited to build a final part shape layer by layer. If the layers are thin and dimensionally accurate enough, a final net part shape results, which has the advantage that no additional machining or trimming is required. A disadvantage is that, because the layers are thin, many layers are required to build the part, so the process requires a significant amount of time to perform, especially on large parts. It is desirable, therefore, to reduce the time needed to perform this process, which may also decrease manufacturing costs.

The approach widely used for manufacturing large parts using 3D printing, commonly referred to as near net shape, is to deposit material in thicker layers (compared to net shape 3D printing), which yields a final part that is slightly larger than the final net shape desired, and then to machine the part to the final net size and shape. The advantage is that it is substantially faster than the thin layer approach. However, a mechanism, or a machine, to perform the trimming or machining operations is required to achieve the final net size and shape.

In the first 3D printing approach, with the downward moving worktable, parts are generally printed on one machine and trimmed on a separate machine. The requirement that vertical motion be accomplished by moving the sometimes large worktable makes trimming, using this moving worktable approach, impractical for machining operations.

During operation using the second approach, with a fixed worktable and moving nozzle, both printing and trimming can be performed on the same machine by providing mechanisms to move the print head and the trimming head independently of each other over the same worktable. While the trimming mechanism is off the worktable, the part is printed using the printing mechanism. Once the printing is completed, the printing mechanism moves off the worktable. Subsequently, once the printing mechanism is moved off the worktable, the trimming mechanism is used to machine and trim the printed part to the final net size and shape. In this approach, the worktable is fixed, and the printing and trimming mechanisms maneuver over the worktable.

One way to configure a machine to operate in this manner is to position the worktable in the center located near the floor and to position two walls on either side of the worktable. The top edge of the walls support linear trackways with two gantry structures that span between the walls and move on the trackways. One gantry is equipped with the printing mechanism, and the second gantry is equipped with the trimming mechanism. With this configuration, a part, up to the overall size of the worktable, can be printed using the print gantry, and then the part can be machined or trimmed to size to form a solid finished part using the trimming gantry.

In the practice of the aforementioned processes, some major disadvantages have been encountered. Both of the described printing approaches—either using a fixed or a movable worktable—share a common limitation. In each of the two described printing approaches, the maximum height of the part that can be printed is determined by the maximum number of layers that can be printed, which is limited by the height of the machine. In other words, in both approaches, the height of the part is limited to the height of a computer numeric control (CNC) machine. In order to produce long parts, tall machines are required, which is impractical due to general machine structure limitations and building ceiling height limitations.

SUMMARY

Aspects of the present disclosure relate to, among other things, methods and apparatus for fabricating components via additive manufacturing, e.g., 3D printing techniques. Each of the aspects disclosed herein may include one or more of the features described in connection with any of the other disclosed aspects. A principle object of the present invention is to provide a method for producing long parts without increasing the height of the machine. One embodiment of the disclosure includes a vertically oriented worktable on a wheel or slide mechanism located on top of a fixed horizontal worktable. Conveyor belts, independently movable by servomotors and gearboxes, are located on top of at least a portion of the fixed horizontal worktable. The vertically oriented worktable is located towards an end of the conveyor belts and fixed horizontal worktable. At a front edge of the horizontal worktable there may be a chill plate, e.g., a liquid cooled chill plate, that may cover a conveyor roller. The print mechanism may operate at a position off the front edge of the chill plate. The print mechanism may be configured to print so that each vertical layer is deposited approximately flush with the front edge of the chill plate, and each time a new layer is printed, the vertical worktable may move in a direction away from the front edge of the chill plate. With this arrangement, the print mechanism may operate off of the front edge of the worktable with a compression roller (discussed further below) positioned against the front edge of the chill plate. As this process continues, the first layer moves off the back edge of the chill plate onto a conveyor belt attached to the vertical worktable. In an exemplary version of the present disclosure, one or more conveyor belts may be attached to a bottom of a displaceable vertical worktable so that one or more conveyor belts are displaceable (e.g., slide) across a length of a horizontal worktable. In this way, the length of the horizontal worktable may be used to print a part.

The finished, solid part may then be separated from the vertical worktable and may rest on the one or more conveyor belts once the part has printed completely. The vertical worktable may then be detached from the one or more conveyor belts, moved in front of the trim area, and the trim gantry may then be used to machine the part to the desired final size and shape. In some embodiments, the vertical worktable may be removed from the machine completely, and the part may then be machined to the final size and shape. Once machining or trimming is completed, the one or more conveyor belts may be pulled back under the fixed horizontal worktable, which may transport the finished part off the front or the back of the machine. In one embodiment of the present disclosure, an apparatus for fabricating components via additive manufacturing may include a programmable CNC machine. The CNC machine may comprise a first worktable, wherein the first worktable is oriented along an x-y plane of the CNC machine, and a second worktable, wherein the second worktable is oriented along a y-z plane of the CNC machine. At least one conveyor belt may be operably coupled to the first worktable, and a printing gantry may be mounted above the first worktable. The printing gantry may be displaceable along an x-axis of the CNC machine. The CNC machine may also comprise an applicator having a nozzle configured to deliver a bead of flowable material to the second worktable.

In another embodiment of the present disclosure, an apparatus for fabricating components via additive manufacturing may include a programmable CNC machine. The CNC machine may comprise a first worktable, wherein the first worktable extends in a first plane of the CNC machine, and a second worktable, wherein the second worktable extends in a second plane of the CNC machine, and wherein the second plane is oriented at an angle relative to the first plane. At least one conveyor belt may be operably coupled to the first worktable. A printing gantry may be displaceable along a first axis of the CNC machine. An applicator may comprise a nozzle configured to deposit material on the second worktable.

In another embodiment of the present disclosure, an apparatus for fabricating components via additive manufacturing may include a programmable CNC machine. The CNC machine may comprise a first worktable oriented along a first axis of the CNC machine, and a second worktable oriented along a second axis of the CNC machine, wherein the second axis is oriented orthogonal to the first axis of the first worktable. A printing gantry may be displaceable along the first axis of the CNC machine. An applicator may be mounted to the printing gantry, wherein the applicator may include a nozzle for depositing material on the second worktable. A trimming gantry may be displaceable along the first axis of the CNC machine. At least one conveyor belt may be associated with the first worktable.

Embodiments of the present disclosure are also drawn to additive manufacturing methods of fabricating an article. An additive manufacturing method may be performed with a programmable computer numeric control (CNC) machine. The CNC machine may include a first worktable and a second worktable oriented at an angle to the first worktable. The second worktable may be removable. The CNC machine may also include a printing gantry having a nozzle configured to deposit material on the first and second worktables, and the printing gantry may be configured to move in a plane parallel to the first worktable. An exemplary method may comprise depositing a first layer of material on a surface of a second worktable. The method may also comprise displacing the second worktable relative to a first worktable. The method may also comprise exposing the first layer of material to a chill plate and depositing a second layer of material on the first layer of material, wherein the first and second layers of material form a portion of an article. The method may also comprise trimming a portion of the article with a trimming tool mounted on a trimming gantry of the CNC machine.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the term "long" will refer to a component having one dimension that is larger than the other dimensions and encompasses long, tall, wide, etc.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated herein, and constitute a part of this specification, illustrate exemplary aspects of the present disclosure and together with the description, serve to explain the principles of the disclosure.

DETAILED DESCRIPTION OF THE INVENTION

The present disclosure is drawn to, among other things, methods and apparatus for fabricating components via additive manufacturing techniques, such as, e.g., 3D printing. Specifically, the methods and apparatus described herein comprise a method for producing long parts without increasing the height of the machine. For example, a vertical worktable and a vertically oriented applicator assembly may be used to print long, solid 3D parts along a horizontal axis of the machine, thus, avoiding the need to increase the height of the machine. In some aspects of the present disclosure, an applicator assembly for delivering a flowable material (e.g., thermoplastic material) may be configured to deliver the material in either a vertical or a horizontal orientation by changing the orientation of the deposition head from a vertical orientation to a horizontal orientation, and vice versa. In doing so, the deposition head may print, for example, the flowable material onto a suitable surface (e.g., a bead board) vertically and/or horizontally. For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
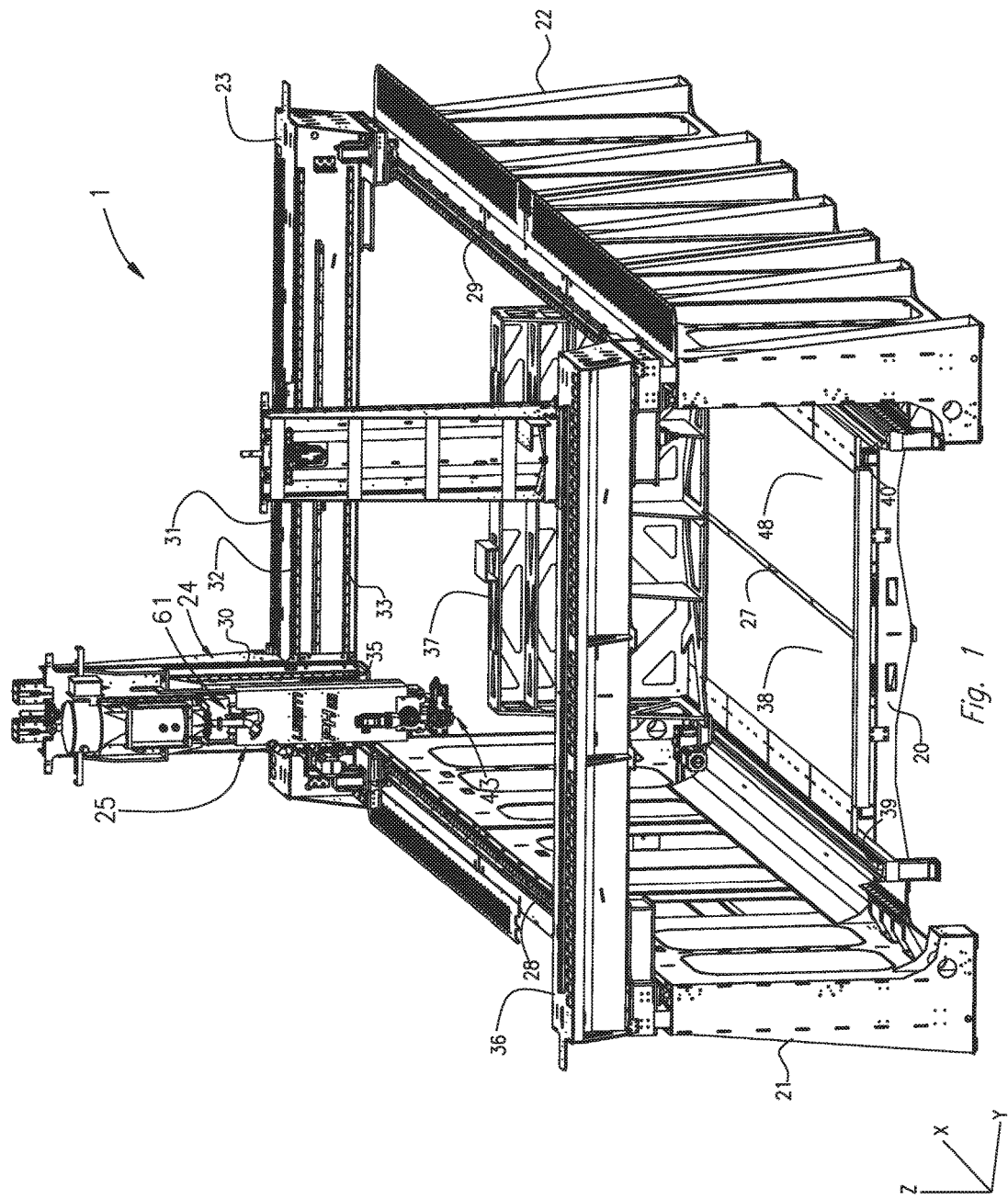
FIG. 1 is a perspective view of an exemplary CNC machine for additive manufacturing process in forming articles in an additive manufacturing process, according to an aspect of the present disclosure.

With reference now to FIG. 1, there is illustrated a CNC machine 1 embodying aspects of the present disclosure. A controller (not shown) may be operatively connected to CNC machine 1 for displacing an application nozzle 51 along a longitudinal line of travel (x-axis), a transverse line of travel (y-axis), and a vertical line of travel (z-axis), in accordance with a program inputted or loaded into the controller for performing an additive manufacturing process to form a desired component. In some examples, the program may be inputted or loaded into the computer for forming long 3D printed components. CNC machine 1 may be configured to print or otherwise build 3D parts from digital representations of the 3D parts (e.g., AMF and STL format files) programmed or loaded into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle 51 carried by a print head or applicator head 43 of the system. The flowable material may be deposited as a sequence of beads or layers on a substrate in an x-y plane. In some examples, the x-y plane may be used for printing long parts without increasing the height of the machine. The extruded, flowable material may fuse to previously deposited material and may solidify upon a drop in temperature. The position of the print head relative to the substrate may then be incrementally advanced along a z-axis (perpendicular to the x-y plane), and the process may then be repeated to form a 3D part resembling the digital representation.

CNC machine 1, shown in FIG. 1, includes a bed 20 provided with a pair of transversely spaced side walls 21 and 22, a printing gantry 23, and a trimming gantry 36 supported on opposing side walls 21 and 22, a carriage 24 mounted on printing gantry 23, a carrier 25 mounted on carriage 24, an extruder 61, and an applicator assembly 43 mounted on carrier 25. Located on bed 20 between side walls 21 and 22 is a horizontal worktable 27 provided with a support surface. The support surface may be disposed in a x-y plane, and may be fixed or displaceable along an x-axis and/or a y-axis. For example, in a displaceable version, horizontal worktable 27 may be displaceable along a set of rails mounted on bed 20. Displacement of horizontal worktable 27 may be achieved using one or more servomotors and one or more of rails 39, 40 mounted on bed 20 and operatively connected to horizontal worktable 27.

Printing gantry 23 and trimming gantry 36 are disposed along a y-axis, supported on side walls 21 and 22. In FIG. 1, printing gantry 23 and trimming gantry 36 are mounted on a set of guide rails 28, 29, which are located along a top surface of side walls 21, 22. Printing gantry 23 and/or trimming gantry 36 may either be fixedly or displaceably mounted, and, in some aspects, printing gantry 23 and trimming gantry 36 may be disposed along an x-axis. Printing gantry 23 and trimming gantry 36 may be displaceable by a set of servomotors (not shown) mounted on printing gantry 23 and trimming gantry 36 and operatively connected to tracks, e.g., guide rails 28, 29, provided on side walls 21 and 22 of bed 20. In an exemplary displaceable version, one or more servomotors may control movement of either printing gantry 23 and/or trimming gantry 36.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 35 supported on carriage 24 for displacement of carrier 25 relative to carriage 24 along a z-axis. Carrier 25 may be displaceable along the z-axis by a servomotor (not shown) mounted on carriage 24 and operatively connected to carrier 25. Vertical worktable 37, attached to conveyor belts 38 and 48 and located on top of horizontal worktable 27, may be displaceable along rails 39 and 40 in the x-axis by one or more servomotors (not shown) connected to vertical worktable 37 and operatively connected to tracks, e.g., guide rails 39, 40, provided on the top of bed 20. In some example, guide rails 39, 40 may be located adjacent bed 20 or along the sides of bed 20. In an exemplary displaceable version, one or more servomotors may control movement of conveyor belts 38 and 48 so that conveyor belts 38 and 48 may be operated to turn in the same direction to advance vertical worktable 37 along the x-axis.

Figure 2:
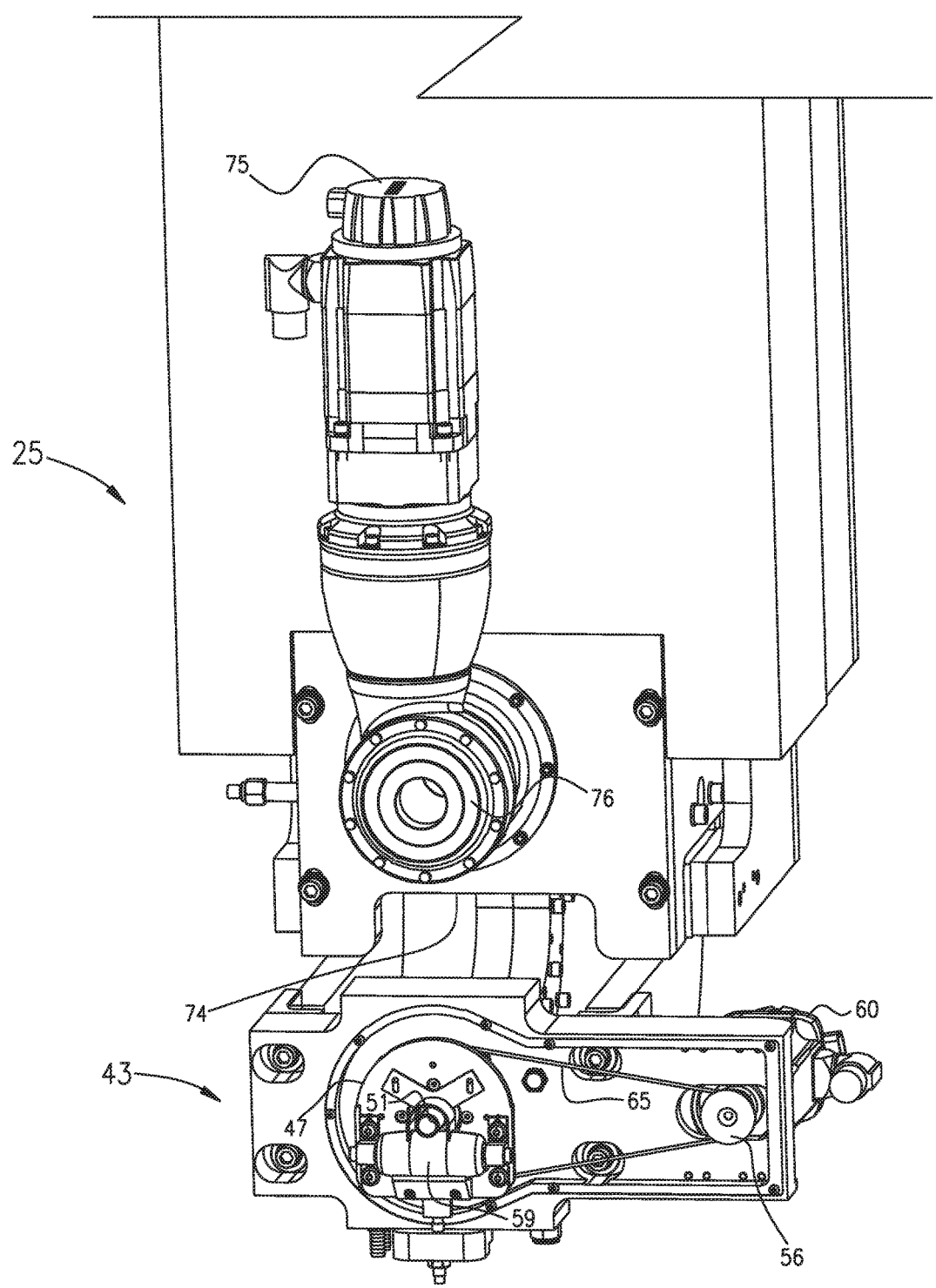
FIG. 2 is an enlarged perspective view of an exemplary applicator head assembly of the exemplary CNC machine shown in FIG. 1.

As best shown in FIG. 2, mounted to carrier 25 is a positive displacement gear pump 74, which may be driven by a servomotor 75, through a gearbox 76. Gear pump 74 receives molten plastic from extruder 61, shown in FIG. 1. A bead shaping roller 59, for compressing material, may be mounted on carrier bracket 47. Roller 59 may be movably mounted on carrier bracket 47, for example, rotatably or pivotably mounted. Roller 59 may be mounted so that a center portion of roller 59 is aligned with nozzle 51. In some examples, roller 59 may be oriented tangential to nozzle 51. Roller 59 may be mounted relative to nozzle 51 so that material, e.g., one or more beads of flowable material (such as thermoplastic resin), discharged from nozzle 51 is smoothed, flattened, leveled, and/or compressed by roller 59. One or more servomotors 60 may be configured to move, e.g., rotationally displace, carrier bracket 47 via a pulley or sprocket 56 and drive-chain or belt 65 arrangement, or by any other suitable means.

Figure 3:
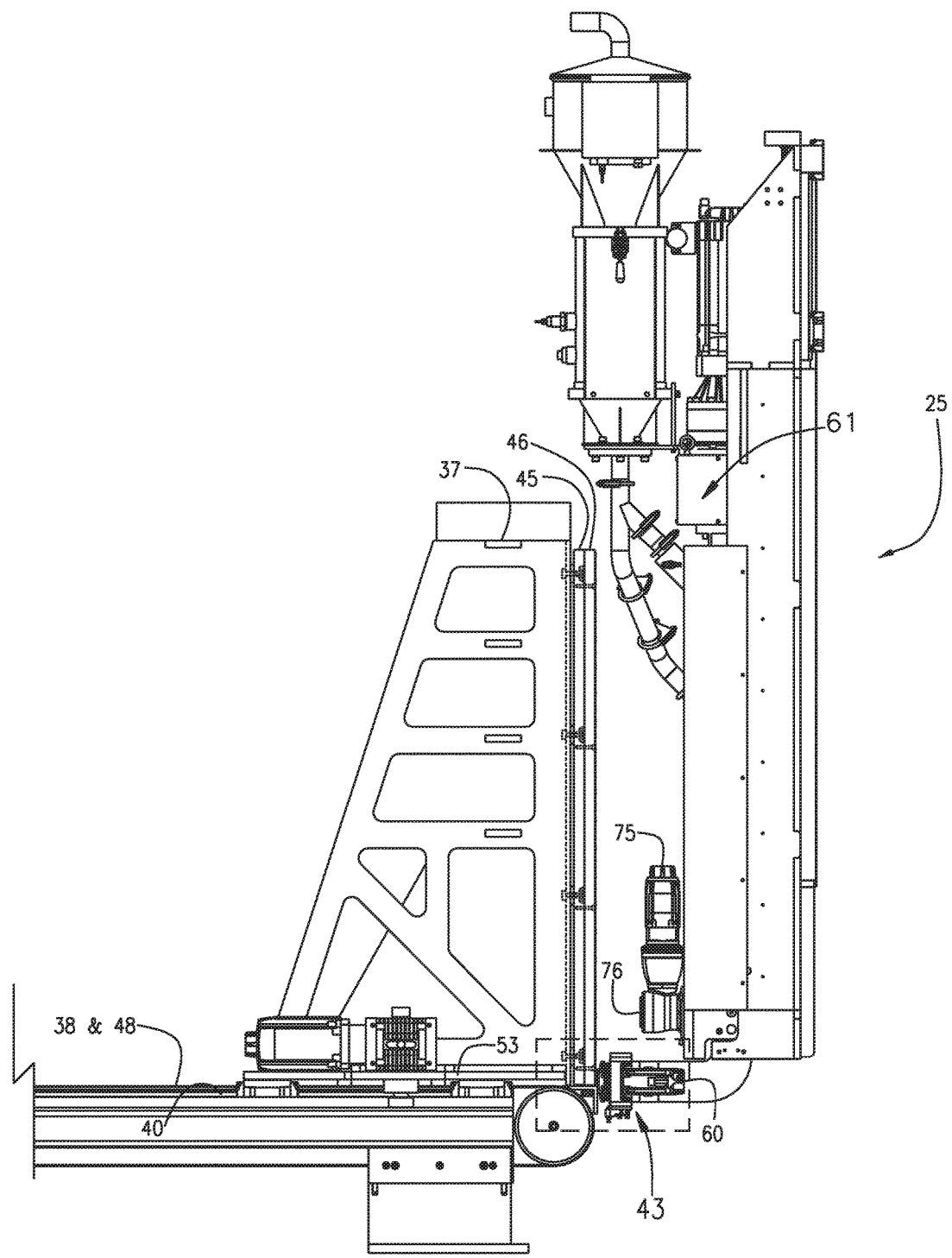
FIG. 3 is a side view of an exemplary vertical worktable and an exemplary printing carrier assembly of the exemplary CNC machine shown in FIG. 1.

With reference to FIG. 3, a machine for manufacturing long parts without increasing the height of the machine includes vertical worktable 37 operatively connected to rails 39, 40. Rails 39, 40 (39 not shown in FIG. 3) are located on top of fixed horizontal worktable 27, as best shown in FIG. 1. In some examples, vertical worktable 37 may be operably connected to one or more independently movable servomotors and gearboxes to move vertical worktable 37 along the x-axis and along rails 39, 40. Secured to a bottom of vertical worktable 37 are conveyor belts 38, 48. Conveyor belts 38, 48 may be operatively connected to vertical worktable 37 to advance a partially formed or finally formed 3D printed part along the x-axis. In an exemplary version of displaceable vertical worktable 37, conveyor belts 38, 48 may be used to produce or form a long 3D printed part without increasing the height of machine 1 by rolling the desired printed part along the surface of conveyor belts 38, 48 mounted on horizontal worktable 27 during operation of machine 1. During operation of machine 1, the long dimension of the printed part is manufactured along a long axis of conveyor belts 38, 48 so that conveyor belts 38, 48 may move the part as additional flowable material is added to further print the part.

Conveyor belts 38, 48 may be comprised of stainless steel or other suitable material and may include a suitable coating. In an exemplary version, a bottom surface of conveyor belts 38, 48 may be coated with a polytetrafluoroethylene coating, a non-stick coating, Teflon® (a registered trademark owned by Chemours), or other suitable material. Exemplary coatings may be friction-reducing and may facilitate sliding of conveyor belts 38, 48 across horizontal worktable 27.

Secured to a longitudinal surface of vertical worktable 37 is a base plate 45 and a bead board 46. Base plate 45 is first secured to vertical worktable 37, and bead board 46 is secured to a surface of base plate 45. Base plate 45 and/or bead board 46 may be securely mounted to each other or with vertical worktable 37 using a combination of bolts, fasteners, tee-nuts, screws, adhesive, or any other suitable securing devices, as shown in FIG. 3, and discussed further below. In some examples, base plate 45 may be formed from plywood, or other suitable material or combination of materials. In an example, bead board 46 may be a piece of substructure, e.g., of medium density fiberboard (MDF), or high grade plywood, or any other suitable material.

Figure 4:
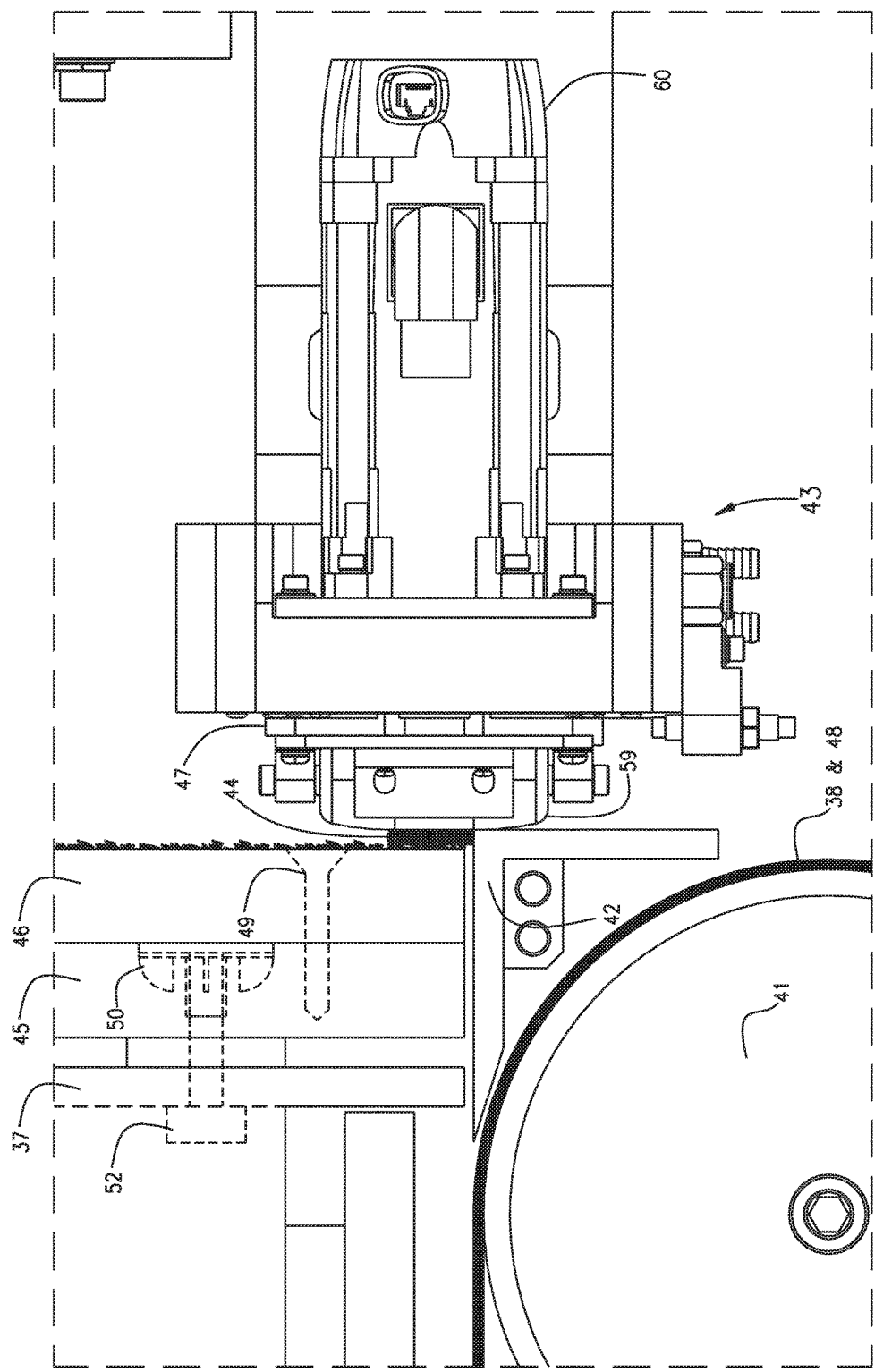
FIG. 4 is an enlarged, side view section of the exemplary vertical worktable and the exemplary printing carrier assembly of FIG. 3.

In some embodiments, bead board 46 may have one side at least partially covered in adhesive or a bonding layer, e.g., a glue or other suitable material, and infused with thermoplastic pellets, as shown in FIG. 4. This step may be performed before printing of the part has initiated. The adhesive infused with thermoplastic pellets may be used to create a weak bond between the printed part and bead board 46 so that, once printing is completed, or when trimming is completed, enough force may be applied to the printed part to break the glue bond, separating the completed printed part from the substructure, e.g., separating the printed part from bead board 46 of vertical worktable 37.

In one embodiment, a surface of bead board 46 may be coated with the adhesive or bonding layer. The bonding layer may be comprised of an adhesive, a liquid, a liquid adhesive, or a settable liquid. The bonding layer, typically comprising a type of polyvinyl acetate glue (or any other suitable adhesive), may be first applied to the surface of bead board 46. For example, the adhesive material or glue may be applied to bead board 46 by a brush, a roller, or one more spray nozzles. The pellets, as shown in deposited form in FIG. 4, may be of any suitable material. For example, in one embodiment, pellets may be made of thermoplastic material. The pellets may be deposited on the adhesive material such that at least a portion of each pellet is within or on the adhesive material so that the pellets are secured to the adhesive material (and, consequently, bead board 46) when the adhesive material cures or otherwise sets. Those of ordinary skill in the art will understand that the pellets may be deposited in any suitable uniform or non-uniform pattern.

When the adhesive material sets, the individual pellets become bonded to the surface of the bead board 46. Any loose pellets may then be removed in any suitable manner. For example, loose or otherwise unsecured thermoplastic pellets may be removed via suction by a shop grade vacuum cleaner or other suitable device. This results in a prepared pellet bed extending along the path of the first layer of flowable material, e.g., thermoplastic material, to be printed, as shown in FIG. 4. In an exemplary version, the prepared pellet bed including thermoplastic beads of bead board 46 may be used to break away a finally formed article, or 3D printed part, as described earlier, from the vertical worktable 37.

During operation of CNC machine 1, when the first layer of molten thermoplastic material is deposited onto the layer of bonded pellets of bead board 46, one or more beads of hot material fuse to the pellets, holding the printed layer of material firmly in place. The adhesive layer, or glue, which remains slightly pliable after the curing process, softens and becomes slightly more pliable when heated by the application of molten thermoplastic material. Accordingly, the individual pellets may be free to move by an amount sufficient to impede the development of stress between the initial thermoplastic bead(s) and the adhesive layer. In other words, as a first layer of heated molten thermoplastic material is applied over the prepared pellet bed, the adhesive layer softens, thus, allowing pellets to move and create a weak attachment to bead board 46. Correspondingly, the tendency for the final printed part to distort is significantly reduced. After the printed structure is cooled, enough force is applied to the printed part to break the glue bond between the printed part and bead board 46, separating the final printed part from the substructure, e.g., bead board 46 of vertical worktable 37.

The aforementioned process creates an adequate surface to print a desired article or 3D printed part on that reduces the amount of stresses induced into the part as the part or article cools and solidifies.

During operation of machine 1, a molten bead 44 of a flowable material (e.g., molten thermoplastic) under pressure from a source disposed, similar to extruder 61 on carrier 25, travels through positive displacement gear pump 74 by use of servomotor 75 and gearbox 76 to a vertically oriented applicator 43 and out the attached nozzle 51, as shown with reference to FIGS. 2 and 3. Vertically oriented applicator 43 may be fixedly (or removably) connected to, and in fluid communication with, nozzle 51.

As shown in the enlarged view in FIG. 4, when molten bead 44 leaves applicator 43 through nozzle 51 (as shown in FIG. 2), molten bead 44 is applied to bead board 46 attached to vertical worktable 37. Roller 59 compresses molten bead 44 once the bead of thermoplastic material is deposited on the surface of bead board 46. As shown in FIG. 4, molten bead 44 rests on top of chill plate 42. Chill plate 42 may be located approximately flush with a front edge of molten bead 44. Chill plate 42 may be used to cool molten bead 44 so that bead 44 does not stick to or bond with a horizontal supporting surface of vertical worktable 37 and/or conveyor belts 38, 48. Chill plate 42 may be used to cool a bottom surface of a formed part during operation of machine 1. Chill plate 42 may cool the formed part until the part is sufficiently solidified so that when a portion of the formed part contacts one or both conveyor belts 38, 48, the formed part is rigid and does not sag and/or drag on worktable 27. Chill plate 42 may also be used so that a formed part is adequately suspended above worktable 27 by at least a thickness of conveyor belts 38, 48.

Chill plate 42 may be used to create a flat, straight corner where the printing will occur. Chill plate 42 may also be used to cover a conveyor belt roller 41 to prevent any unwanted, uncooled thermoplastic material from molten bead 44 from entering the machinery associated with or around conveyor belt roller 41. During operation of CNC machine 1, conveyor belt roller 41 may be configured to move or advance one or both conveyor belts 38, 48.

In an exemplary version of chill plate 42, the cooling may permit the printing of flowable material, e.g., thermoplastic material, at temperatures that may otherwise be too hot for conveyor belts 38, 48 to tolerate. After the first layer of thermoplastic material is applied, and prior to depositing the next layer, vertical worktable 37 and conveyor belts 38, 48 move away from vertically oriented applicator 43 by a distance equal to a thickness of one layer of molten bead 44. This process may be repeated for every additional layer of molten bead 44 deposited by vertically oriented applicator 43, via nozzle 51, by the use of one or more servomotors and gearboxes. This process may continue until the desired printed article or part, which may be as long as the full length of horizontal worktable 27 (with reference to FIG. 1), is finished. In some aspects, the part may be longer than horizontal worktable 27, e.g., conveyor belts 38, 48 may move the partially formed part at least partially off of horizontal worktable 27 so that printing may continue.

The finished printed article or part is then detached from vertical worktable 37. The printed part maybe detached from vertical worktable 37 in one of two ways. One or more screws 49, bolts/fasteners 52, and/or tee-nuts 50 may be placed on a surface of vertical worktable 37, base plate 45, and/or bead board 46 to securely mount vertical worktable 37 to base plate 45 and bead board 46 to base plate 45, as shown in FIG. 4. Screws 49 or bolts/fasteners 52 may be placed so as not to be covered by the printed part, and arranged so as to attach the bead board 46 to base plate 45 as shown. Screws 49, fasteners 52, and tee-nuts 50 may be of a size that is close enough to the desired printed part so as to not to interfere with the trimming operation.

Base plate 45 and bead board 46 may be made from a thick (e.g., ¼") wood-based material (e.g., plywood, MDF, etc.). Holes in vertical worktable 37 may be used to attach base plate 45 to vertical worktable 37 using tee-nuts 50. Bead board 46 may also be attached to base plate 45 using screws 49 (e.g., dry wall screws). Although the location of screws 49 may vary, in some embodiments, screws 49 may be located as close to where the part will be printed as possible, but not so close that screws 49 would contact the trimming tool of trimming gantry 36 during the trimming operation. Moreover, screws 49 may be positioned far enough away from the intended location of the printed part so that screws 49 may be removed without removing the printed part from bead board 46. This may allow bead board 46 to be separated from base plate 45 with the printed part attached after printing.

In some examples, base plate 45 may be removably attached to vertical worktable 37 and/or removably attached to bead board 46. One of ordinary skill in the art may appreciate that any other suitable means may be used to fixedly or removably secure vertical worktable 37 to base plate 45 and bead board 46 to base plate 45. In some examples, bolts/fasteners 52 threaded into tee-nuts 50 or bolts/fasteners 52 in base plate 45 may be removed from a back side of vertical worktable 37.

In some examples, vertical worktable 37 may be detached from conveyor belts 38, 48 in order to remove a finished, solid part from CNC machine 1. Conveyor belts 38, 48 may be attached to an edge of vertical worktable 37, for example, a back, bottom edge of vertical worktable 37. Conveyor belts 38, 48 may extend from the back, bottom edge to the end of CNC machine 1, where conveyor belts 38, 48 may wrap around a conveyor belt roller. Conveyor belts 38, 48 may then extend underneath a length of CNC machine 1 from one end to the other end of CNC machine 1, where conveyor belts 38, 48 may wrap around a second conveyor belt roller. Conveyor belts 38, 48 may then extend along a top surface of horizontal worktable 27 to the bottom, front edge of vertical worktable 37, where it is attached to vertical worktable 37. In other words, conveyor belts 38, 48 may be attached at opposite ends of vertical worktable 37 and may wrap around horizontal worktable 27.

A cross plate 53, as shown in FIG. 3, may be displaceable by one or more servomotors and/or gearboxes. Vertical worktable 37 and conveyor belts 38, 48 may be attached to and displaceable along cross plate 53. As an alternative, vertical worktable 37 and conveyor belts 38, 48 may instead be attached to and displaceable along the z-axis of trimming gantry 36. The finished, solid part may be removed from CNC machine 1 by either moving cross plate 53 or the z-axis of trimming gantry 36, which, in turn, may move conveyor belts 38, 48 to transport the finished, solid part off of CNC machine 1, e.g., off either side of CNC machine 1.

Once detached from vertical worktable 37, the weight of the finished, solid part may hold the part in place for trimming by trimming gantry 36. The finished part may be removed from CNC machine 1, for example, using an overhead crane or a hoist attached to the bottom of printing gantry 23 and/or trimming gantry 36.

In some examples, cross plate 53 may be used to attach conveyor belts 38, 48 to vertical worktable 37. Cross plate 53 may be fixed, e.g., bolted, to one or more drive mechanisms, which may be located on each side of CNC machine 1. Vertical worktable 37 may be removed from cross plate 53 while keeping ends of conveyor belts 38, 48 still attached to cross plate 53. Conveyor belts 38, 48 may be detachably secured to cross plate 53 so that cross plate 53 may be unbolted from the machine (e.g., drive mechanism on each side of machine 1). In removing cross plate 53, access to CNC machine 1 may be improved, if necessary.

During operation of machine 1, as the final printed part rests on conveyor belts 38, 48, vertical worktable 37 may be unbolted or removed from conveyor belts 38, 48. The final printed part or article may then be moved to the front of CNC machine 1 behind the trimming area and below or near trimming gantry 36 (of FIG. 1) by actuating conveyor belt roller 41 to advance conveyor belts 38, 48 to move the final part in a direction away from printing gantry 23 and towards trimming gantry 36. Subsequently, trimming gantry 36 may then be operated to machine or trim the part to a desired final size and shape. During operation of machine 1, in some embodiments, vertical worktable 37 may be completely removed from CNC machine 1, and trimming gantry 36 (FIG. 1) may be used to machine or trim the part to the desired final size and shape. Once the part machining or trimming is complete, the trimmed, final part may be conveyed off the front or back end of horizontal worktable 27 by conveyor belts 38, 48 or may be otherwise lifted or removed from CNC machine 1.

Figure 5:
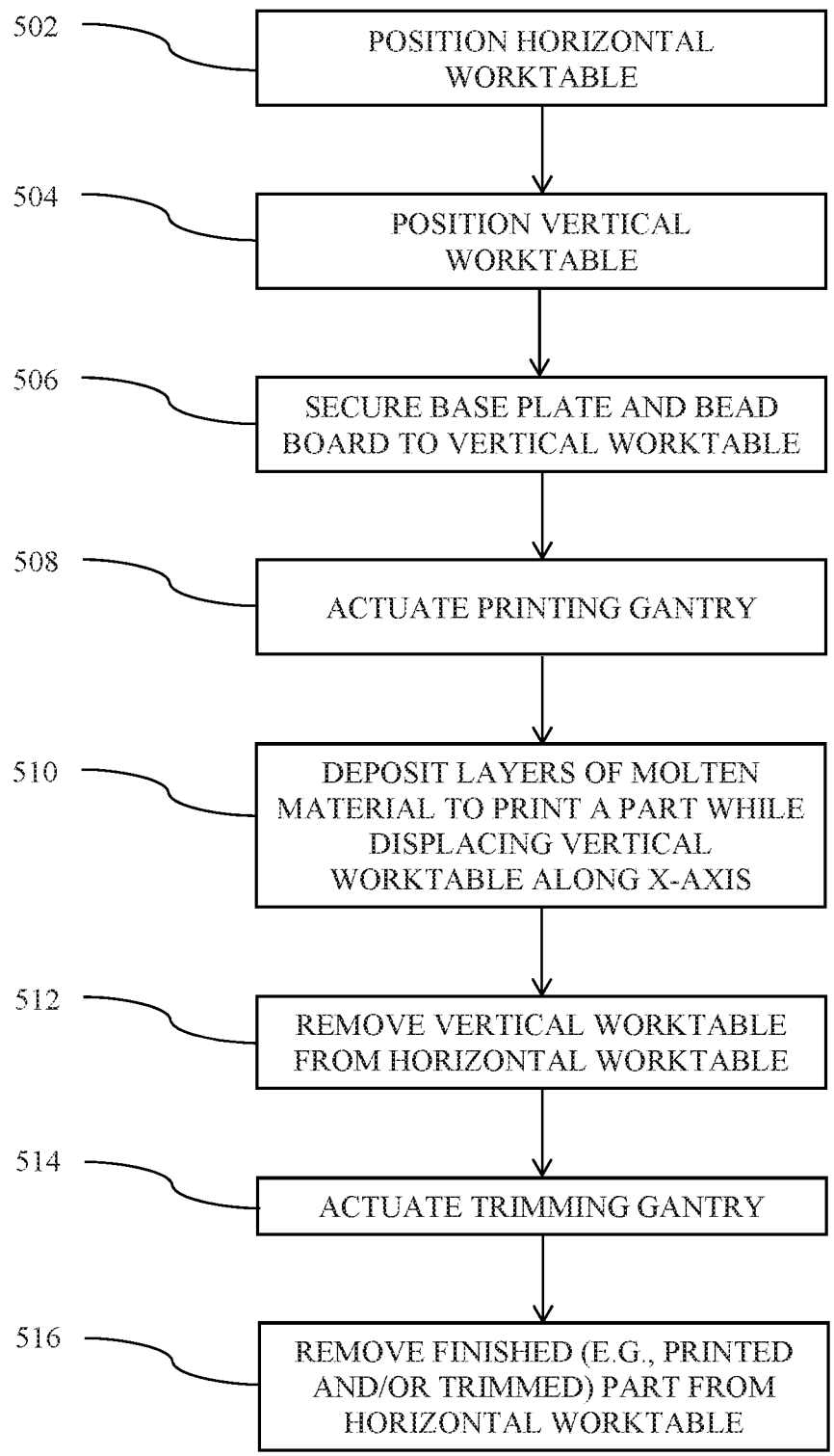
FIG. 5 is a flow-chart depicting steps of an exemplary method, according to an aspect of the present disclosure.

FIG. 5 depicts an exemplary additive manufacturing method of printing and trimming a part using CNC machine 1. At a first step 502, horizontal worktable 27 may be positioned on the x-y plane. At least one of conveyor belts 38, 48 may be mounted to the top of horizontal worktable 27. At a next step 504, vertical worktable 37 may be positioned along the y-z plane so that vertical worktable 37 is removably secured to horizontal worktable 27. Vertical worktable 37 may be positioned orthogonal to horizontal worktable 27 and parallel to printing gantry 23 and trimming gantry 36. At a step 506, base plate 45 and bead board 46 are removably secured to a surface of vertical worktable 37, as described earlier. Once bead board 46 is mounted to vertical worktable 37, CNC machine 1, specifically, printing gantry 23 and carrier 25, may be operable to deliver flowable molten thermoplastic material 44 at a step 508 to commence printing of a desired article. At step 508, printing gantry 23, carriage 24, carrier 25, extruder 61, and vertically oriented applicator assembly 43 may operate with each other, according to instructions provided by CNC machine 1, to deliver a first layer of molten bead 44 of a flowable material (e.g., molten thermoplastic) from nozzle 51 and onto a surface of bead board 46 of vertical worktable 37. The first layer is deposited with an initial thickness.

Next, at a step 510, vertical worktable 37 may be advanced along the x-axis by a distance equal to the thickness of the first layer of deposited material 44. At step 510, vertically oriented applicator assembly 43 deposits a second layer of molten material 44, and any necessary subsequent layers, until the desired article is completely printed. At step 510, as additional layers are deposited, vertical worktable 37 simultaneously or sequentially moves away from an end of horizontal worktable 27 towards an opposing end along the x-axis. In some embodiments, conveyor belts 38, 48 may advance vertical worktable 37 using conveyor belt roller 41 to move vertical worktable 37 as molten bead 44 is deposited on bead board 46 when forming the desired article. In some embodiments, vertical worktable 37 may be operably driven by one or more independently movable servomotors and gearboxes to move vertical worktable 37 along the x-axis and along rails 39, 40. Also, at step 510, as vertical worktable 37 is advanced along the x-axis, the desired article moves over chill plate 42 to cool deposited molten bead 44. Step 510 is repeated until the desired article is printed.

Subsequently, at a next step 512, once the desired article, e.g., finally printed part, is completely printed, vertical worktable 37 is removed from horizontal worktable 27. At step 512, as vertical worktable 37 may be removed from horizontal worktable 27, the printed part breaks away from the surface of bead board 46 along a break line created by the thermoplastic pellet bed described earlier. The printed part is now separated from bead board 46 of vertical worktable 37.

At a next step 514, conveyor belts 38, 48 move along horizontal worktable 27 so as to advance the finally printed part along the x-axis and position the printed part below trimming gantry 36. In some embodiments, trimming gantry 36 may also move along guide rails 28, 29 so that trimming gantry 36 is positioned over the printed part. At a step 516, trimming gantry 36 is operable, according to instructions provided by CNC machine 1, to trim the printed part to a desired final part. At a last step 516, conveyor belts 38, 48 are operable to move the desired final part off the horizontal worktable 27 along the x-axis and onto either an extension bed or other suitable extension of worktable 27, a floor of a factory in which machine 1 is located, or the bed of a truck or other suitable vehicle, for example. In some embodiments, the final part may be lifted by a crane or hoisted off of CNC machine 1, for example.

While steps 502-516 are depicted in a particular order, the principles of the present disclosure are not limited to the order depicted in FIG. 5.

In the course of fabricating a component, pursuant to the methods described herein, the control system of CNC machine 1, in executing the inputted program, may operate the several servomotors as described to displace either printing gantry 23 or trimming gantry 36 along the x-axis, displace vertical worktable along the x-axis, displace carriage 24 along the y-axis, displace carrier 25 along the z-axis, and rotate bracket 47 about the x-axis thereof, in accordance with the inputted program, to provide the desired end product or a near duplicate thereof. In some examples, bracket 47 may carry compression roller 59 so that when compression roller 59 is rotated from printing on a horizontal plane to printing on a vertical plane, compression roller 59 changes from rotating about the z-axis to rotating about the x-axis.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

What is claimed is:
1. A programmable computer numeric control (CNC) machine, the CNC machine comprising:
   a first worktable extending in a first plane;
   a second worktable extending in a second plane, wherein the second plane is oriented at an angle relative to the first plane;
   at least one conveyor belt operably coupled to the first worktable;

a printing gantry displaceable along a first axis of the CNC machine; and an applicator having a nozzle configured to deposit material on the second worktable.

2. The CNC machine of claim 1, further comprising a trimming gantry displaceable along the first axis of the CNC machine, wherein the trimming gantry includes a trimming tool.

3. The CNC machine of claim 1, wherein the second worktable includes a surface removably mounted to the second worktable.

4. The CNC machine of claim 3, wherein the nozzle is positioned relative to the removable surface so as to deposit the material on the removable surface when the removable surface is mounted to the second worktable.

5. The CNC machine of claim 1, wherein the at least one conveyor belt is configured to selectively engage the second worktable.

6. The CNC machine of claim 1, further comprising a chill plate.

7. The CNC machine of claim 6, wherein the chill plate at least partially covers the at least one conveyor belt.

8. The CNC machine of claim 1, wherein the second worktable is configured to move along the first axis.

9. A programmable computer numeric control (CNC) machine, the CNC machine comprising:

a first worktable oriented along a first axis of the CNC machine;

a second worktable oriented along a second axis of the CNC machine, wherein the second axis is oriented orthogonal to the first axis of the first worktable;

a printing gantry displaceable along the first axis of the CNC machine;

an applicator mounted on the printing gantry, the applicator including a nozzle for depositing material on the second worktable;

a trimming gantry displaceable along the first axis of the CNC machine; and at least one conveyor belt associated with the first worktable.

10. The CNC machine of claim 9, further comprising a chill plate.

11. The CNC machine of claim 10, wherein the second worktable includes a surface removably mounted to the second worktable for receiving the deposited material, and wherein the removable surface is adjacent the chill plate.

12. The CNC machine of claim 9, wherein the at least one conveyor belt is configured to selectively engage the second worktable.

13. An additive manufacturing method of fabricating an article with a programmable computer numeric control (CNC) machine having a first worktable, a second worktable oriented at an angle to the first worktable, wherein the second worktable is removable, and a printing gantry having a nozzle configured to deposit material on the first and second worktables, the printing gantry being configured to move in a plane parallel to the first worktable, the method comprising:

depositing a first layer of material on a surface of the second worktable;

displacing the second worktable relative to the first worktable;

exposing the first layer of material to a chill plate;

depositing a second layer of material on the first layer of material, wherein the first and second layers of material form a portion of the article; and trimming a portion of the article with a trimming tool mounted on a trimming gantry of the CNC machine.

14. The method of claim 13, wherein the second worktable is displaced along a first axis by a distance equal to a thickness of the first layer of material after depositing the second layer of material.

15. The method of claim 13, wherein during deposition of the first layer of material and the second layer of material, the nozzle is positioned in a plane orthogonal to the surface of the second worktable.

16. The method of claim 13, wherein during deposition of the first layer of material and the second layer of material, the nozzle is positioned in a plane parallel to the surface of the second worktable.

17. The method of claim 13, further comprising removing the second worktable from the CNC machine before trimming the portion of the article with the trimming tool.

18. The method of claim 13, further comprising moving the trimming gantry along the first axis.

19. The method of claim 13, further comprising moving the first layer of material onto at least one conveyor belt after the first layer of material is exposed to the chill plate.

20. The method of claim 19, further comprising removing the trimmed article from the CNC machine using the at least one conveyor belt, wherein the at least one conveyor belt selectively engages the second worktable.

* * * * *